US009400529B2

(12) United States Patent
Chang

(10) Patent No.: US 9,400,529 B2
(45) Date of Patent: Jul. 26, 2016

(54) ELECTRONIC DEVICE HAVING HOUSING WITH EMBEDDED INTERCONNECTS

(71) Applicant: Apple Inc., Cupertino, CA (US)

(72) Inventor: Ray L. Chang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 14/040,322

(22) Filed: Sep. 27, 2013

(65) Prior Publication Data

US 2015/0092382 A1     Apr. 2, 2015

(51) Int. Cl.
*G06F 1/16* (2006.01)
*H04M 1/02* (2006.01)

(52) U.S. Cl.
CPC ............ *G06F 1/1683* (2013.01); *G06F 1/1656* (2013.01); *H04M 1/0277* (2013.01)

(58) Field of Classification Search
CPC .... H01Q 1/243; H01Q 1/2266; G06F 1/1632; G06F 1/1683; G06F 1/1698
USPC .................................................. 174/260–261
See application file for complete search history.

(56) References Cited

U.S. PATENT DOCUMENTS

| | | | | | |
|---|---|---|---|---|---|
| 4,359,707 A | * | 11/1982 | Spannhake | ............ | H01J 29/003 315/8 |
| 4,894,017 A | * | 1/1990 | Stein | ..................... | H01R 12/712 439/595 |
| 5,430,608 A | * | 7/1995 | Honda | ................... | G06F 1/1616 174/377 |
| 5,644,320 A | * | 7/1997 | Rossi | ..................... | G06F 1/1616 343/702 |
| 5,684,672 A | * | 11/1997 | Karidis | ................. | G06F 1/1616 343/702 |
| 5,969,775 A | * | 10/1999 | Jeong | ..................... | H01J 29/003 315/8 |
| 6,055,026 A | * | 4/2000 | Wada | ....................... | H04N 5/65 348/820 |
| 6,283,792 B1 | * | 9/2001 | Tolmie | ................... | H01R 21/62 439/108 |
| 6,388,627 B1 | * | 5/2002 | Masaki | ................ | H01Q 1/2266 343/702 |
| 6,469,681 B1 | * | 10/2002 | Jones | ..................... | H01Q 1/088 343/702 |
| 6,509,877 B2 | * | 1/2003 | Masaki | ................ | G06F 1/1616 343/702 |
| 6,556,453 B2 | | 4/2003 | Figueroa et al. | | |
| 6,608,259 B1 | * | 8/2003 | Norskov | ....................... | 174/261 |
| 6,628,236 B2 | * | 9/2003 | Kim | ...................... | G06F 1/1616 343/702 |
| 6,980,159 B2 | * | 12/2005 | Sun | ....................... | G06F 1/1616 343/700 MS |
| 6,995,718 B2 | * | 2/2006 | Fang | ...................... | G06F 1/1601 343/702 |
| 7,271,769 B2 | * | 9/2007 | Asano | ................... | G06F 1/1616 343/700 MS |
| 7,286,372 B2 | | 10/2007 | Aronson et al. | | |
| 7,294,791 B2 | * | 11/2007 | Danoski et al. | ............... | 174/261 |
| 7,486,243 B2 | * | 2/2009 | Wulff | ................ | B29C 45/14639 343/702 |
| 7,557,762 B2 | * | 7/2009 | Shimasaki | ............. | H01Q 13/10 343/702 |
| 7,679,893 B2 | * | 3/2010 | Lam | ...................... | G06F 1/1616 312/223.2 |
| 7,706,143 B2 | * | 4/2010 | Lang | .................. | H05K 7/20627 361/688 |

(Continued)

*Primary Examiner* — Adrian S Wilson
(74) *Attorney, Agent, or Firm* — Treyz Law Group, P.C.; G. Victor Treyz; Joseph F. Guihan

(57) ABSTRACT

An electronic device has an electronic device housing containing electrical components such as integrated circuits and other components. The electronic device housing may be provided with signal paths. Electrical components may be mounted to the electronic device housing and may be electrically coupled to the signal paths. The housing may be provided with channels in which signal lines are routed. The housing may be formed from a material such as metal. A layer of dielectric in the channel may be interposed between the metal of the housing and the signal lines in the channel. Capacitive coupling and inductive coupling may be used to electrically couple the electrical components to a signal line in the channel. Solder may be used to solder contacts on the electrical components to a signal line in the channel. Meandering channels and channels that traverse right-angled surfaces may be used.

24 Claims, 24 Drawing Sheets

(56) References Cited

U.S. PATENT DOCUMENTS

| | | | | |
|---|---|---|---|---|
| 7,802,632 B2* | 9/2010 | Kristen | | B25D 17/00 173/171 |
| 7,828,987 B2 | 11/2010 | Schneider et al. | | |
| 8,068,059 B2* | 11/2011 | Konishi | | G06F 1/1616 343/702 |
| 8,138,977 B2* | 3/2012 | Zhang | | H01Q 1/243 343/702 |
| 8,201,687 B2* | 6/2012 | Zeliff | | G06F 1/1626 206/320 |
| 8,262,411 B2 | 9/2012 | Kondo | | |
| 8,270,914 B2* | 9/2012 | Pascolini | | H01Q 1/243 343/702 |
| 8,350,766 B2* | 1/2013 | Hisaeda | | H01Q 1/1271 343/704 |
| 8,466,839 B2* | 6/2013 | Schlub | | H01Q 1/243 343/702 |
| 8,508,418 B2* | 8/2013 | Kough | | H01Q 1/2266 343/702 |
| 8,665,235 B2* | 3/2014 | Tang | | H01Q 1/1271 345/173 |
| 8,854,263 B2* | 10/2014 | Chiang | | H01Q 1/2266 343/700 MS |
| 8,896,487 B2* | 11/2014 | Chiang | | G06F 1/1616 343/700 MS |
| 9,093,745 B2* | 7/2015 | Yarga | | H01Q 1/243 |
| 2002/0021250 A1* | 2/2002 | Asano | | H01Q 1/22 343/702 |
| 2004/0051670 A1* | 3/2004 | Sato | | G06F 1/1616 343/702 |
| 2004/0140937 A1* | 7/2004 | Yang | | H01Q 1/242 343/702 |
| 2004/0203488 A1* | 10/2004 | Sullivan | | B29C 45/0053 455/90.1 |
| 2005/0269665 A1 | 12/2005 | Wylie et al. | | |
| 2006/0061512 A1* | 3/2006 | Asano | | G06F 1/1616 343/702 |
| 2006/0061958 A1* | 3/2006 | Solomon | | G06F 1/1632 361/679.43 |
| 2006/0109689 A1* | 5/2006 | Tanaka | | G02B 6/0031 362/632 |
| 2007/0044998 A1* | 3/2007 | Chan | | 174/260 |
| 2007/0252699 A1* | 11/2007 | Homer | | G06F 1/1616 340/572.7 |
| 2008/0049949 A1* | 2/2008 | Snider | | H04B 1/082 381/86 |
| 2008/0100518 A1* | 5/2008 | Lev | | H01Q 1/22 343/702 |
| 2008/0165066 A1* | 7/2008 | Tiscareno | | H01Q 1/242 343/702 |
| 2008/0310096 A1* | 12/2008 | Sandesara | | G11B 33/025 361/679.34 |
| 2009/0179806 A1* | 7/2009 | Ji | | G06F 1/1616 343/702 |
| 2010/0073862 A1* | 3/2010 | Carnevali | | G06F 1/1632 361/679.43 |
| 2010/0146308 A1* | 6/2010 | Gioscia | | G06F 1/1632 713/300 |
| 2010/0194336 A1* | 8/2010 | Azancot | | G06F 1/26 320/108 |
| 2010/0238621 A1* | 9/2010 | Tracy | | B29C 45/14639 361/679.27 |
| 2010/0243844 A1* | 9/2010 | Peloza et al. | | 248/310 |
| 2010/0321255 A1* | 12/2010 | Kough | | H01Q 1/2266 343/702 |
| 2012/0050114 A1* | 3/2012 | Li | | H01Q 1/2266 343/702 |
| 2012/0157175 A1* | 6/2012 | Golko | | G06F 1/1698 455/575.7 |
| 2012/0223865 A1* | 9/2012 | Li | | H01Q 9/42 343/702 |
| 2012/0293924 A1* | 11/2012 | Dolci | | G06F 1/1632 361/679.01 |
| 2012/0299841 A1* | 11/2012 | Tang | | H01Q 1/1271 345/173 |
| 2012/0300416 A1* | 11/2012 | Saji et al. | | 361/748 |
| 2013/0127673 A1* | 5/2013 | Chang et al. | | 343/702 |

\* cited by examiner

ELECTRONIC DEVICE HAVING HOUSING WITH EMBEDDED INTERCONNECTS

BACKGROUND

This relates generally to electronic devices and, more particularly, to interconnecting electrical components in electronic devices.

Electronic devices include integrated circuits and other electronic components. These components are mounted on printed circuit boards. Metal lines in the printed circuit boards serve as signal paths. These signal paths, which are sometimes referred to as interconnects, are used to route data and power signals between the integrated circuits and other electronic components in an electronic device.

The printed circuit boards and interconnect structures that are used in an electronic device can have a significant impact on device size and performance. If care is not taken, device housings will be bulkier that desired and printed circuit board interconnect structures will be more complex and costly than desired. Interconnects formed from thin flexible printed circuits may help minimize device bulk, but may be susceptible to damage on sharp internal housing features and may not be sufficiently compact for some applications.

It would therefore be desirable to be able to provide electronic devices with improved interconnect structures.

SUMMARY

An electronic device may have electrical components mounted within an electronic device housing. The electrical components may include integrated circuits and other devices that are mounted on an internal surface of the electronic device housing.

Signal paths may be formed from metal lines on the housing. The signal paths may be used to route signals between the electrical components.

The housing may be provided with channels in which the signal paths are routed. The housing may be formed from a material such as metal. A layer of dielectric in each channel may be interposed between the metal of the housing and the signal paths in the channel.

Capacitive coupling and inductive coupling arrangements may be used to electrically couple an electrical component to a signal path in the channel. Solder may be used to solder contacts on an electrical component to a signal path in the channel. In configurations in which solder is used to electrically couple electrical components to signal paths, the signal paths may be provided with a layer of dielectric such as an inorganic dielectric that can withstand damage at elevated solder reflow temperatures.

Meandering channel shapes and channels that traverse right-angled surfaces and other surface features within the interior of the electronic device housing may be used.

DETAILED DESCRIPTION

Electronic devices may be provided with housings. Electrical components may be mounted within the housings. An electronic device may have signal paths formed from metal lines on a housing. The signal lines may be embedded within recessed portions of the housing such as channels formed on the inner surface of the housing.

Electrical components may be coupled to the signal lines using solder or other direct coupling structures or may be electromagnetically coupled to the signal lines using capacitive coupling or inductive coupling arrangements.

Illustrative electronic devices that have housings that may be provided with signal lines for interconnecting electrical components are shown in FIGS. 1, 2, 3, and 4.

Figure 1:
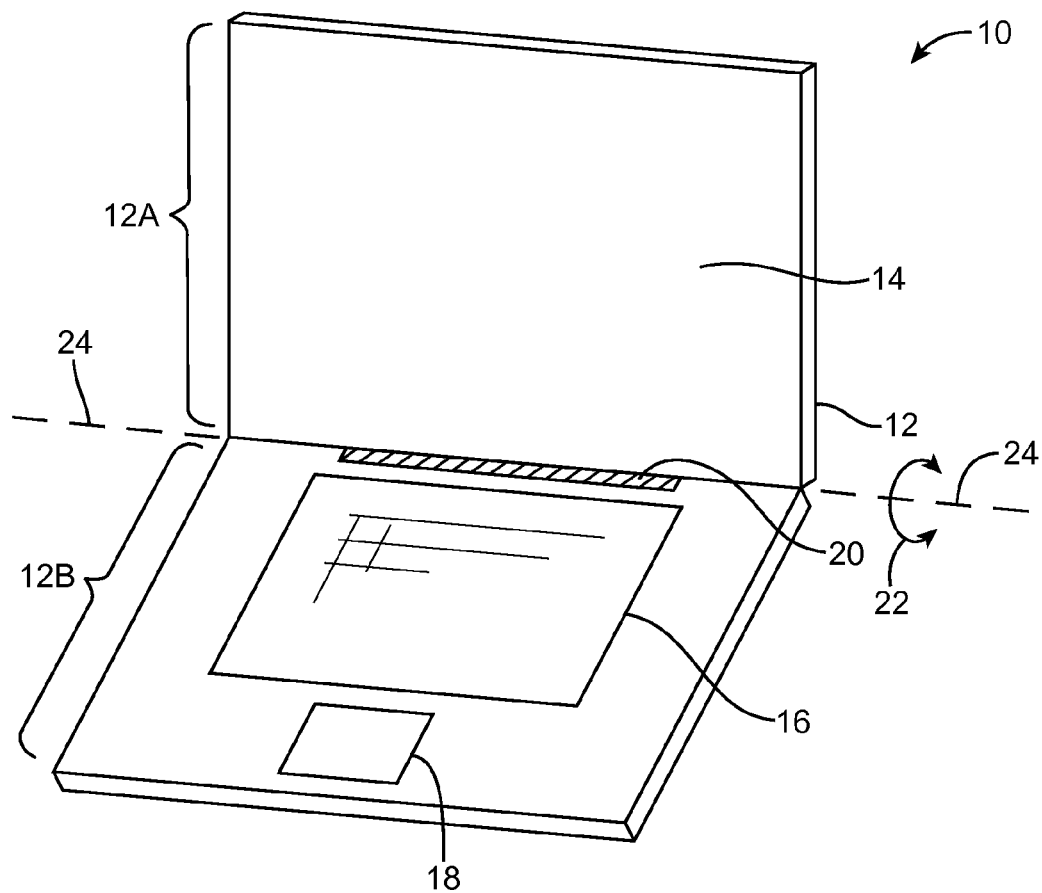
FIG. 1 is a perspective view of an illustrative electronic device such as a laptop computer in accordance with an embodiment.

Electronic device 10 of FIG. 1 has the shape of a laptop computer (portable computer) and has a portable computer housing 12 formed from upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
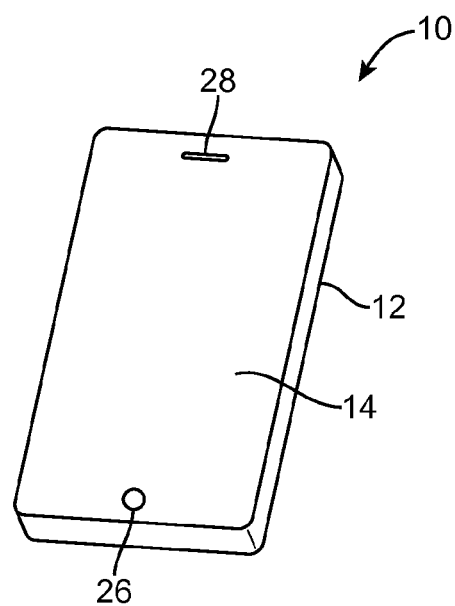
FIG. 2 is a perspective view of an illustrative electronic device such as a handheld electronic device in accordance with an embodiment.

FIG. 2 shows an illustrative configuration for electronic device 10 based on a handheld device such as a cellular telephone, music player, gaming device, navigation unit, or other compact device. In this type of configuration for device 10, housing 12 (e.g., a cellular telephone housing) has opposing front and rear surfaces. Display 14 is mounted on a front face of housing 12. Display 14 may have an exterior layer that includes openings for components such as button 26 and speaker port 28.

Figure 3:
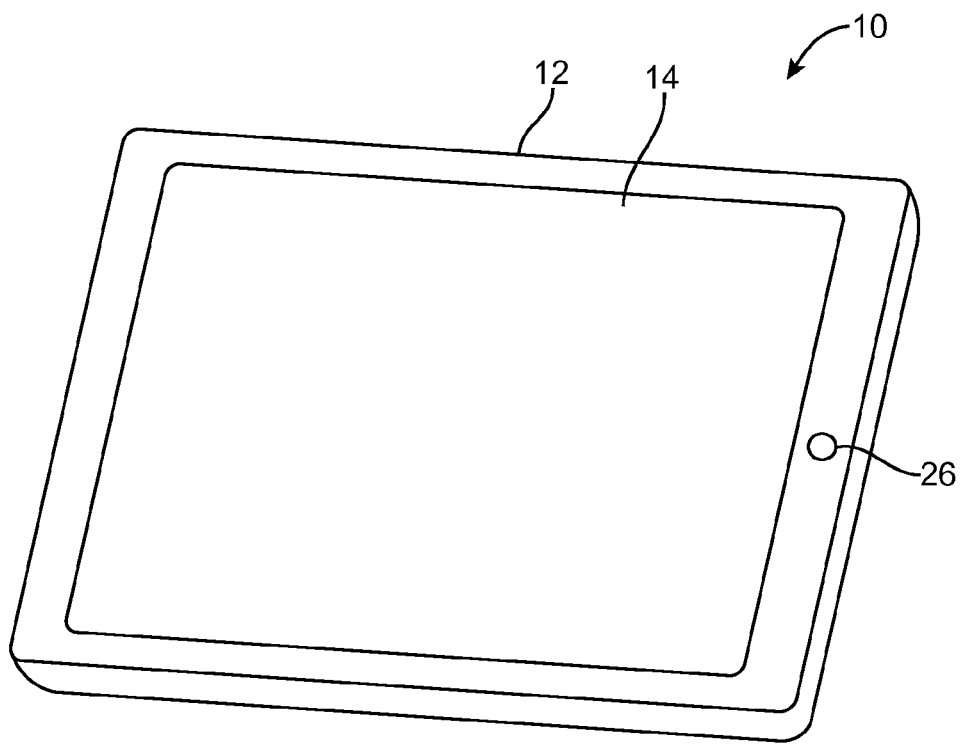
FIG. 3 is a perspective view of an illustrative electronic device such as a tablet computer in accordance with an embodiment.

In the example of FIG. 3, electronic device 10 is a tablet computer. In electronic device 10 of FIG. 3, tablet computer housing 12 has opposing planar front and rear surfaces. Display 14 is mounted on the front surface of housing 12. As shown in FIG. 3, display 14 has an external layer with an opening to accommodate button 26.

Figure 4:
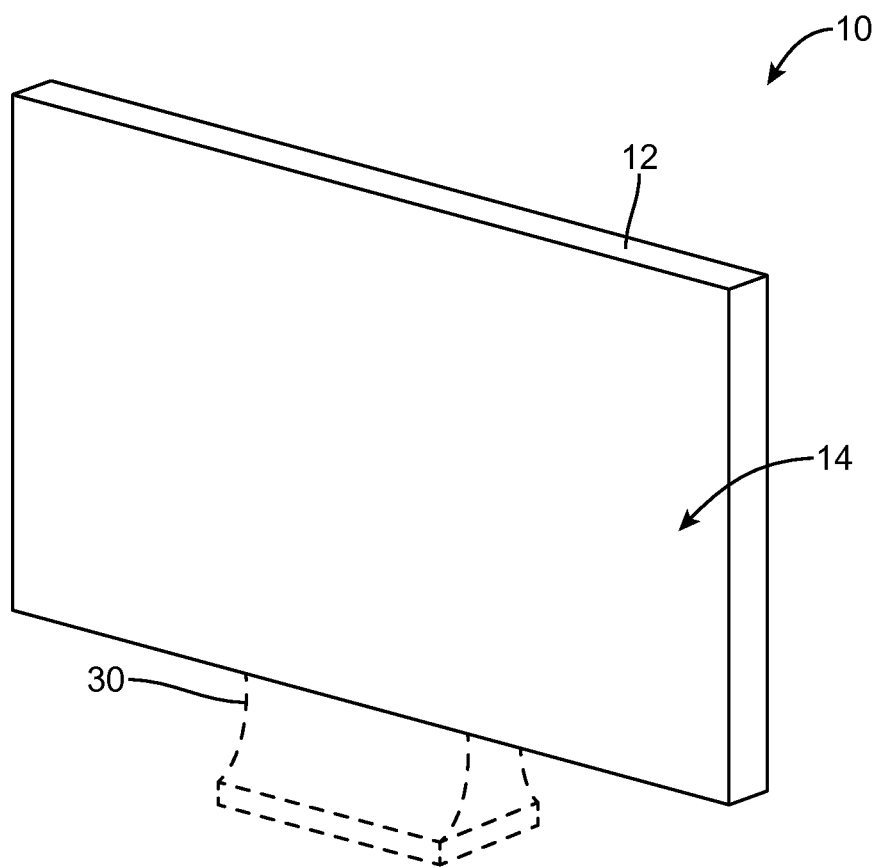
FIG. 4 is a perspective view of an illustrative electronic device such as a display for a computer or television in accordance with an embodiment.

FIG. 4 shows an illustrative configuration for electronic device 10 in which device 10 is a computer display, a computer that has an integrated computer display, or a television. Display 14 is mounted on a front face of housing 12 (e.g., a display housing for a computer, computer monitor, or television). With this type of arrangement, housing 12 for device 10 may be mounted on a wall or may have an optional structure such as support stand 30 to support device 10 on a flat surface such as a table top or desk.

Housing 12 in device 10 (e.g., housing 12 in devices of the type shown in FIGS. 1, 2, 3, and 4 and other electronic devices) may be provided with signal paths (sometimes referred to as interconnects or interconnect paths) for routing signals between electrical components in device 10. The signal paths may be formed from conductive metal signal lines. The conductive metal signal lines may be formed by photolithographic techniques, laser patterning, screen printing, pad printing, ink jet deposition, or other deposition and patterning techniques. Signal lines may be formed on the inner surfaces of housing 12 and may, if desired, be embedded within channels formed in housing 12.

Figure 5:
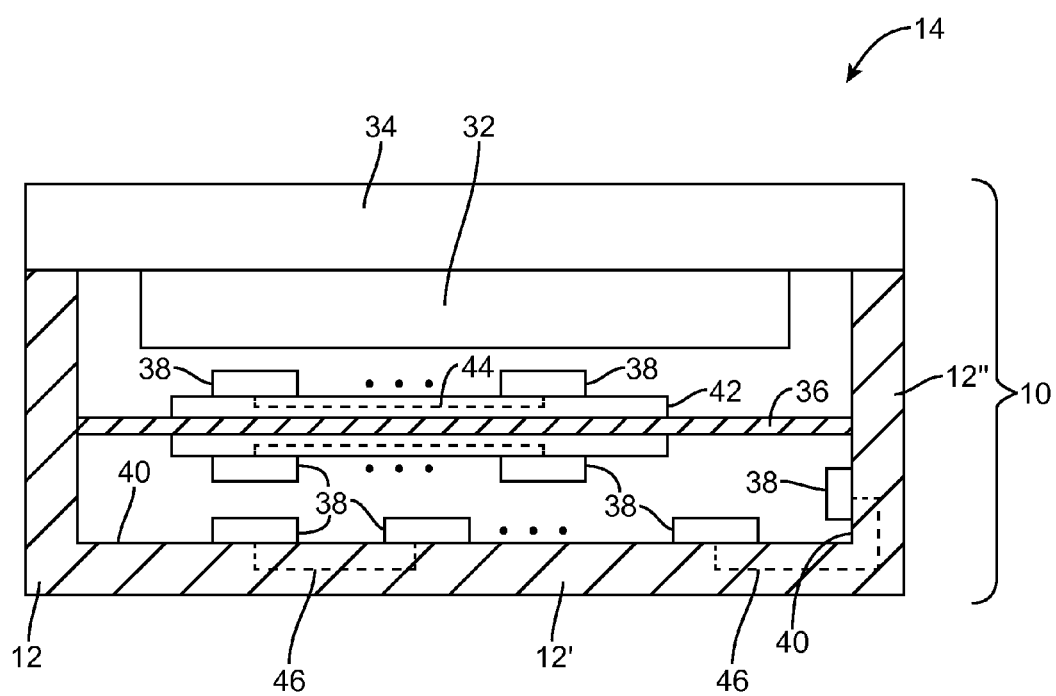
FIG. 5 is a cross-sectional side view of an electronic device in accordance with an embodiment.

A cross-sectional side view of an illustrative electronic device of the type that may be provided with signal lines on the inner surfaces of housing 12 and in channels in housing 12 is shown in FIG. 5. As shown in FIG. 5, display 14 may be formed form a display module such as display module 32 mounted under a cover layer such as display cover layer 34 (as an example). Display 14 (e.g., display module 32) may be a liquid crystal display, an organic light-emitting diode display, a plasma display, an electrophoretic display, a display that is insensitive to touch, a touch sensitive display that incorporates and array of capacitive touch sensor electrodes or other touch sensor structures, or may be any other type of suitable display. Display cover layer 34 may be layer of clear glass, a transparent plastic member, or other clear structure.

Inner housing structures such as optional metal midplate 36 may be mounted within the interior of housing 12 (e.g., to provide additional structural support to device 10 and/or to serve as mounting platforms for printed circuits and other structures). Structural internal housing members such as midplate 36 may sometimes be referred to as housing structures or may be considered to form part of housing 12.

Electrical components 38 may be mounted within the interior of housing 12. Components 38 may be mounted to inner surfaces of housing 12 such as surface 40 and the surfaces of midplate 36 and may be mounted to printed circuit boards such as printed circuit boards 42. Printed circuit boards 42 may include rigid printed circuit boards (e.g., printed circuit boards formed from fiberglass-filled epoxy or other rigid printed circuit board material) and flexible printed circuits (e.g., flex circuits formed from sheets of polyimide or other flexible polymer layers). Patterned metal traces 44 within printed circuit boards 42 may be used to form signal paths between components 38. Conductive signal paths such as conductive signal paths 46 (e.g., metal lines) may also be formed in housing 12 (e.g., on midplate 36 and/or other interior housing surfaces such as inner surface 40 of housing 12). Conductive signal paths 46 (sometimes referred to as interconnects or interconnect paths) may, for example, be formed from metal signal lines on inner surface 40 of rear housing wall 12' and/or on inner surface 40 of housing sidewalls such as sidewall 12".

Figure 6:
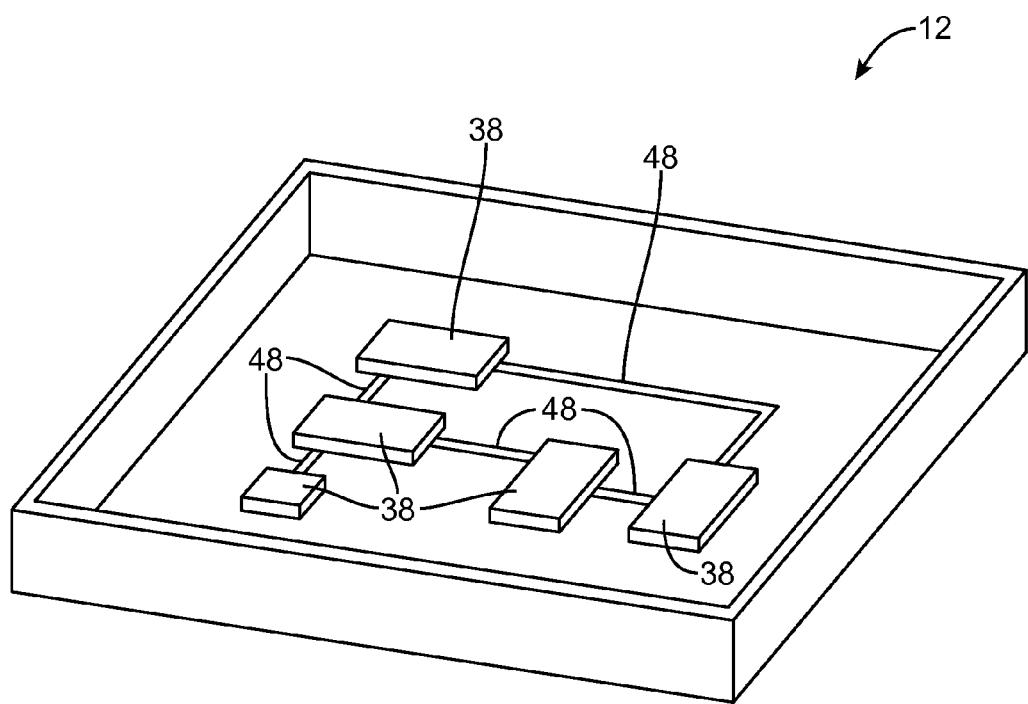
FIG. 6 is a perspective view of a portion of an electronic device housing in which signal lines have been formed in accordance with an embodiment.

FIG. 6 is a perspective view of an interior portion of housing 12 in which electrical components 38 have been mounted. Electrical components 38 may include integrated circuits, discrete components such as inductors, capacitors, and resistors, sensors, switches, connectors, status-indicator lights, audio components such as microphone and speaker structures, display components, buttons, and other electronic components. Signal paths such as signal lines 46 of FIG. 5 may be used for interconnecting electrical components 38.

Signal lines 46 may be embedded within recesses in electronic device housing 12 such as channels 48. Channels 48 may be lined with dielectric (e.g., in configurations for housing 12 in which housing 12 is formed from a conductive material such as metal), thereby preventing metal signal lines 46 from becoming shorted to each other.

Figure 7:
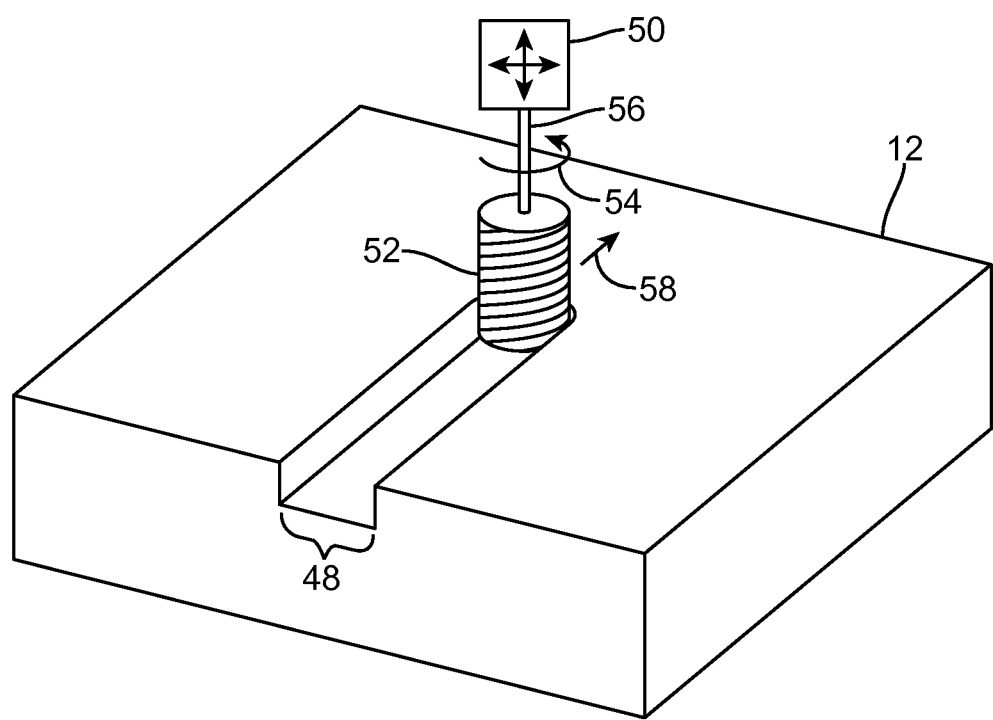
FIG. 7 is a perspective view of illustrative machining equipment of the type that may be used in forming signal lines in an electronic device housing in accordance with an embodiment.

Channels 48 may be formed using machining, laser-based processes, etching, stamping, molding, or other suitable techniques. As shown in FIG. 7, for example, computer-controlled positioner 50 may be used to rotate machine bit 52 in direction 54 about shaft 56. Machine bit 52 may be a drill bit, a milling machine bit, or other tool for machining channels in metal or other housing materials. Channels such as channel 48 in housing 12 of FIG. 7 may be cut by using positioner 50 to move machine bit 52 in direction 58.

Figure 8:
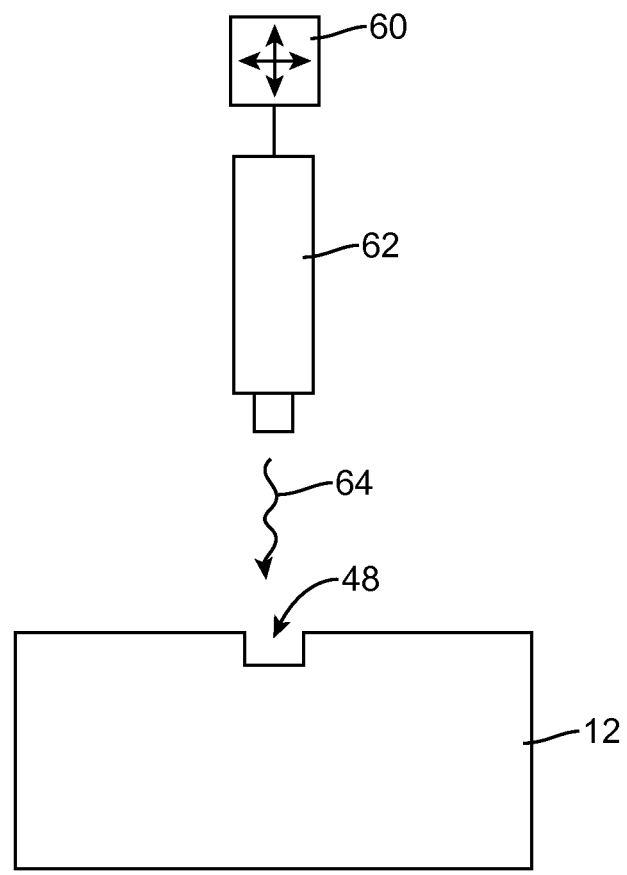
FIG. 8 is a perspective view of illustrative laser-based processing equipment of the type that may be used in forming signal line channels in an electronic device housing in accordance with an embodiment.

In the example of FIG. 8, computer-controlled positioner 60 is being used to control the position of laser 62. Laser 62 may emit light 64 that is directed towards housing 12. When light 64 is applied to housing 12, some of the material of housing 12 is removed (e.g., due to pyrolysis, ablation, photodissociation, melting, etc.), thereby forming channel 48.

Figure 9:
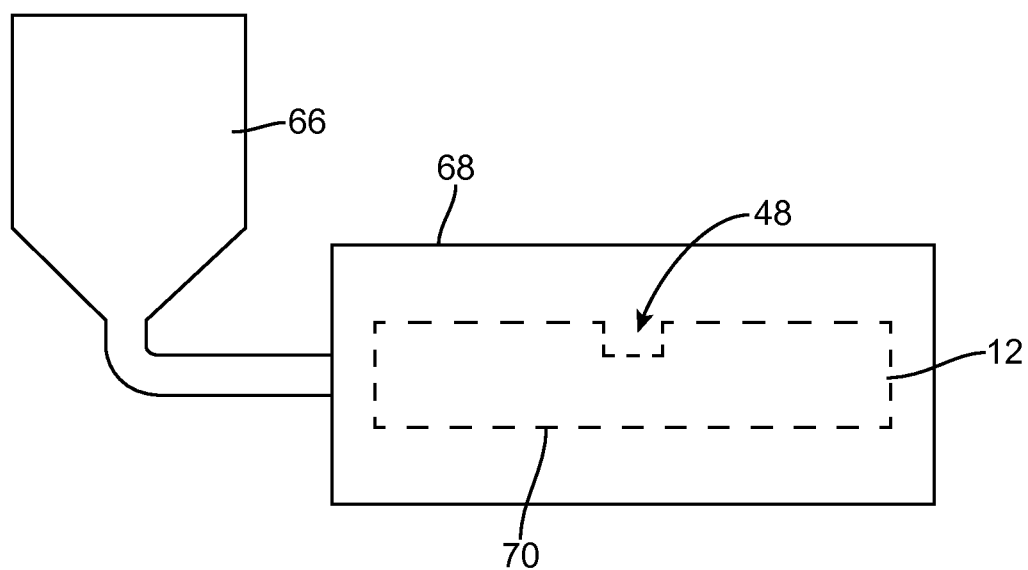
FIG. 9 is a side view of illustrative molding equipment of the type that may be used in forming signal line channels in an electronic device housing in accordance with an embodiment.

As shown in FIG. 9, in configurations in which housing 12 is being formed from molded plastic, a mold die may be used in producing channels 48 in housing 12. Plastic bead reservoir 66 may be used to supply plastic for heated mold 68. Mold 68 may apply heat and pressure to the plastic from reservoir 66 during injection molding operations. Mold 68 preferably contains a cavity having a desired shape for some or all of housing 12, including protrusions corresponding to desired locations for channels 48. When molded housing 12 is removed from mold 68, channels 48 will be present in the locations defined by the protrusions within mold 68.

In configurations in which of housing 12 is formed from plastic, metal signal lines 46 can be formed directly on housing 12 and optionally covered with a layer of polymer or other dielectric (e.g., epoxy sealant, an inorganic dielectric, or other dielectric for environmental protection and protection against undesired short circuits).

Figure 10:
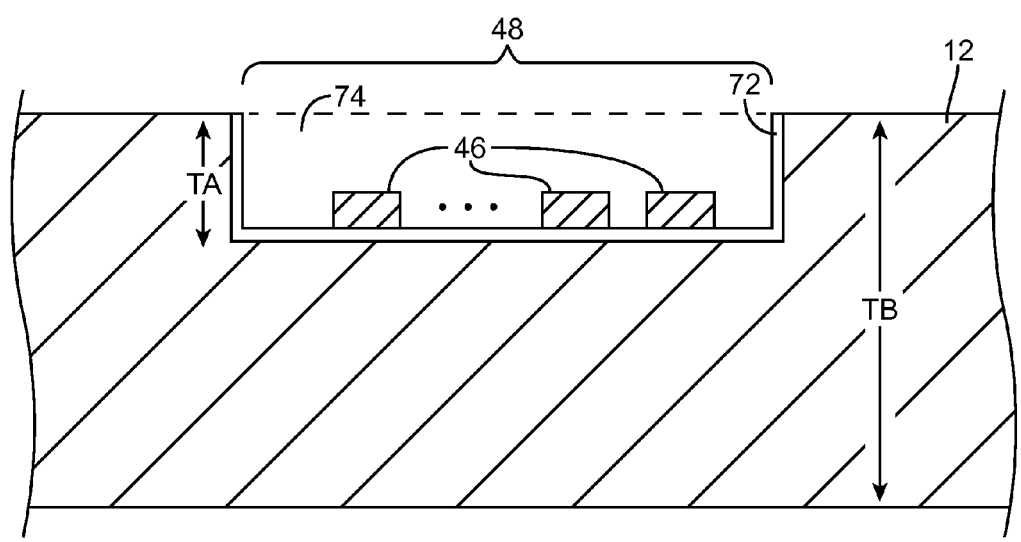
FIG. 10 is a cross-sectional side view of an illustrative electronic device housing in which a channel with interconnects has been formed in accordance with an embodiment.

In configuration in which housing 12 is formed from metal, a layer of dielectric may be formed between metal housing 12 and metal signal lines 46 to help prevent signal lines 46 from becoming shorted to each other through housing 12. This type of arrangement is illustrated in FIG. 10. As shown in FIG. 10, the surface of channel 48 may be coated with dielectric layer 72. Dielectric layer 72 may be formed from a polymer film, an inorganic polymer (e.g., silicon oxide, silicon nitride, etc.) or other dielectric material. After forming metal signal lines 46 on dielectric layer 72, optional dielectric layer 74 may be formed on top of signal lines 46. Layer 74 may be a polymer coating, a coating formed from an inorganic material such as silicon oxide or silicon nitride, or other dielectric material.

Channel 48 may be characterized by a depth (thickness) TA that is less than the thickness of metal housing 12 (i.e., the rear wall or side wall of housing 12). As an example, housing wall thickness TB may be about 0.5 mm and thickness TA may be about 0.15 mm or less (i.e., TA may be one third or less of TB, one quarter or less of TB, one fifth or less of TB, one tenth or less of TB, etc.). Other thicknesses may be used if desired. For example, thickness TB may be 0.3 to 0.7 mm, more than 0.2 mm, more than 0.4 mm, 0.2 to 1.0 mm, less than 2 mm, etc. Thickness TA may less than 0.3 mm, less than 0.2 mm, less than 0.1 mm, more than 0.1 mm, 0.1-0.2 mm, etc. In configurations for housing 12 in which channel 48 is relatively thin, the strength of housing 12 will not be significantly compromised by the presence of channel 48.

Figure 11:
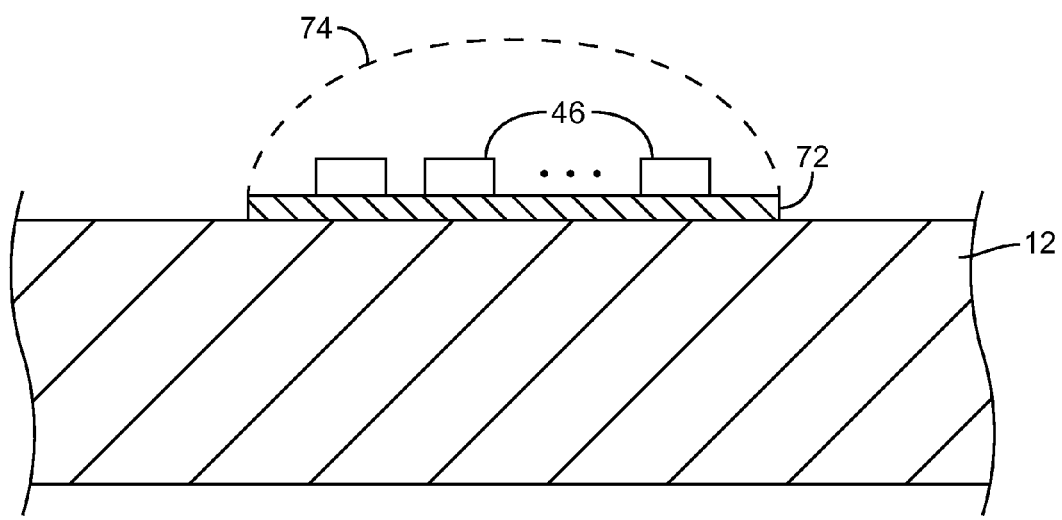
FIG. 11 is a cross-sectional side view of an illustrative electronic device housing in which signal lines have been formed on the housing in accordance with an embodiment.

If desired, metal lines 46 may include metal lines that are formed on non-recessed portions of housing 12, as shown in the cross-sectional side view of FIG. 11. As shown in FIG. 11, dielectric 72 may be formed on a planar inner housing surface 40 (i.e., a surface without channels). Metal signal lines 46 may then be formed on dielectric 72 and may be optionally coated with dielectric 74. If desired, device 10 may have a mixture of signal lines 46 that are formed in channels 48 and that are formed on planar inner housing surfaces 40.

Figure 12:
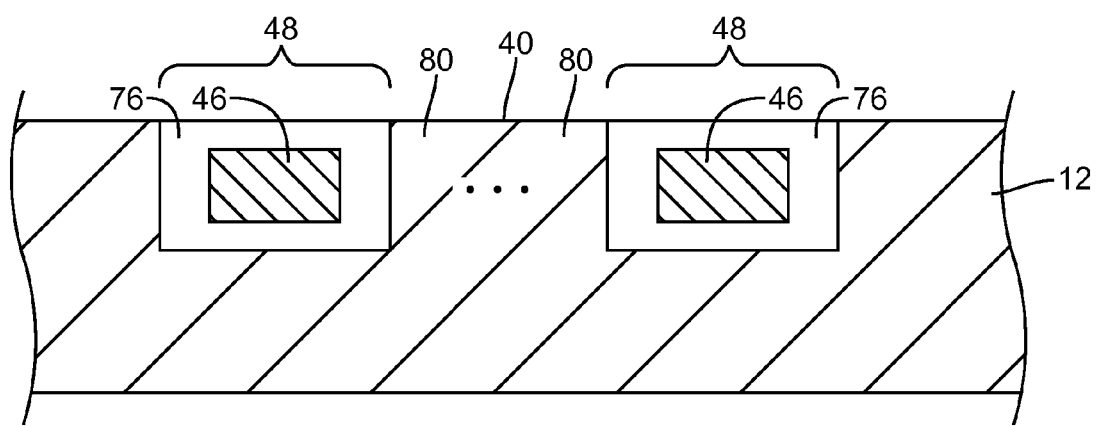
FIG. 12 is a cross-sectional side view of an illustrative electronic device housing in which parallel signal lines have been formed within respective channels in accordance with an embodiment.

FIG. 12 shows how dielectric 76 (e.g., dielectric 72 and dielectric 74) has been formed around metal signal lines 46 in multiple parallel channels 48, rather than forming multiple signal lines within a common channel. With this type of configuration, metal portions 80 are interposed between adjacent signal lines 46. Metal portions 80 serve as electromagnetic shielding and may therefore reduce cross-talk between lines 46.

FIGS. 13, 14, 15, 16, and 17 illustrate how metal signal lines 46 may be formed in channels 48 in a configuration in which housing 12 is formed from a conductive material such as metal.

Figure 13:
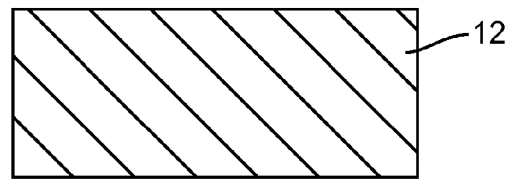
FIG. 13 is a cross-sectional side view of an illustrative housing prior to formation of signal line channels in accordance with an embodiment.
Figure 14:
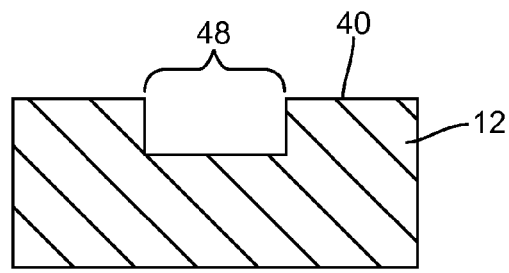
FIG. 14 is a cross-sectional side view of the illustrative housing of FIG. 13 following formation of a signal line channel in accordance with an embodiment.

As shown in FIG. 13, metal housing 12 may initially have no channels 48. For example, housing 12 may be formed from a cast or machined metal part without channels 48. Channels 48 may then be formed in surface 40 of housing 12 (e.g., using machining, laser processing, chemical etching, metal stamping, etc.), as shown in FIG. 14. If desired, channels may be partly or fully formed using a metal casting process. Partly formed cast metal channels may be deepened or otherwise finished using machining and other processing techniques, if desired.

Figure 15:
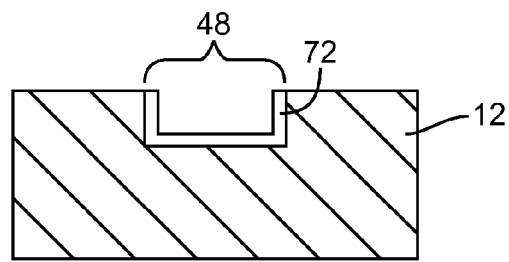
FIG. 15 is a cross-sectional side view of the illustrative housing of FIG. 14 following formation of a dielectric layer within the channel in accordance with an embodiment.

After forming channels 48, dielectric 72 may be formed in channel 48 (i.e., dielectric 72 may be used to line the inner surfaces or at least the lower surface of channel 48), as shown in FIG. 15.

Figure 16:
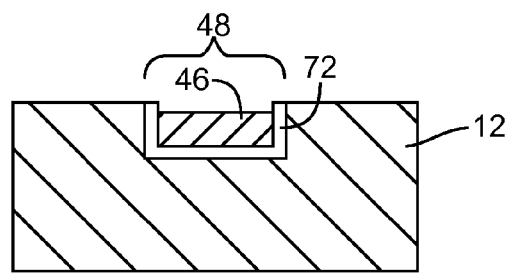
FIG. 16 is a cross-sectional side view of the illustrative housing of FIG. 15 following formation of a signal line within the signal line channel in accordance with an embodiment.

One or more metal signal lines such as illustrative signal line 46 of FIG. 16 may then be formed on dielectric 72 in channel 48, as shown in FIG. 16. Signal lines 46 in device 10 such as signal line 46 of FIG. 16 may be formed from a metal such as copper, gold, aluminum, molybdenum, other metals, alloys of these metals, and/or multiple layers of multiple respective metals.

Figure 17:
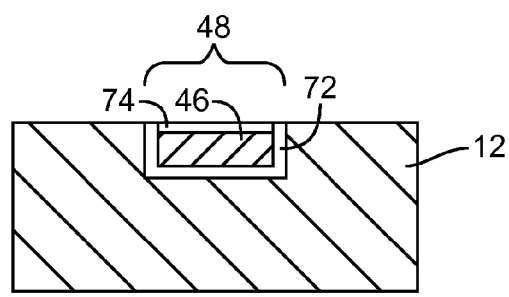
FIG. 17 is a cross-sectional side view of the illustrative housing of FIG. 16 after formation of a dielectric layer in the signal line channel that covers the signal line in accordance with an embodiment.

Following formation of signal line(s) 46 in channel 48 on dielectric 72, additional dielectric such as dielectric 74 of FIG. 17 may be deposited in channel 48 on top of signal line 46. Dielectric 72 and 74 may be formed form the same material or different materials. As an example, both dielectric 72 and dielectric 74 may be polymer, both dielectric 72 and dielectric 74 may be an inorganic dielectric such as silicon oxide or silicon nitride, or dielectric 72 may be an inorganic dielectric such as silicon oxide or silicon nitride while dielectric 74 may be a polymer (or vice versa).

Figure 18:
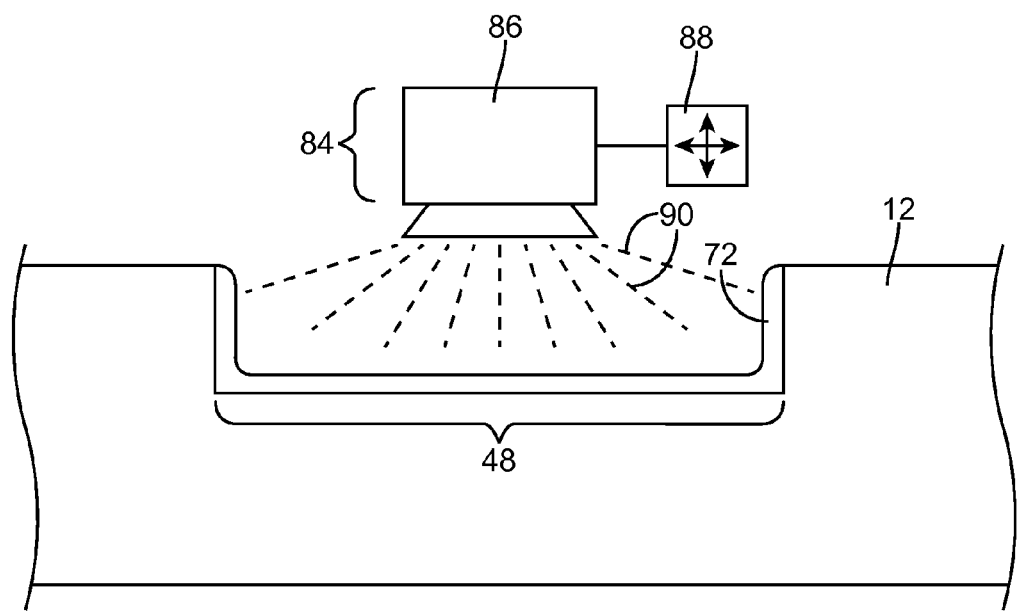
FIG. 18 is a cross-sectional side view of an illustrative electronic device housing in which a dielectric is being deposited within a signal line channel in accordance with an embodiment.

If desired, dielectric may be deposited within channels 48 using localized deposition equipment. As shown in FIG. 18, for example, localized dielectric deposition equipment 84 may use dielectric deposition head 86 and computer-controlled positioner 88 for localized dielectric deposition. Computer-controlled positioner 88 may move head 86 along channels 48. Head 86 may be a nozzle or array of nozzles for dispensing (e.g., spraying) liquid dielectric 90 into channel 48 to form dielectric 72 or may be other equipment for locally depositing dielectric 72. If desired, liquid polymer may be cured following deposition with equipment 84 (e.g., by applying heat and/or light) to form cured dielectric 72. Inorganic materials may be formed in liquid form (e.g., inorganic dielectric 72 may be formed form inorganic particles in a liquid carrier). If desired, screen printing, pad printing, and other localized dielectric deposition techniques may be used to form dielectric 72 in channels 48.

Figure 19:
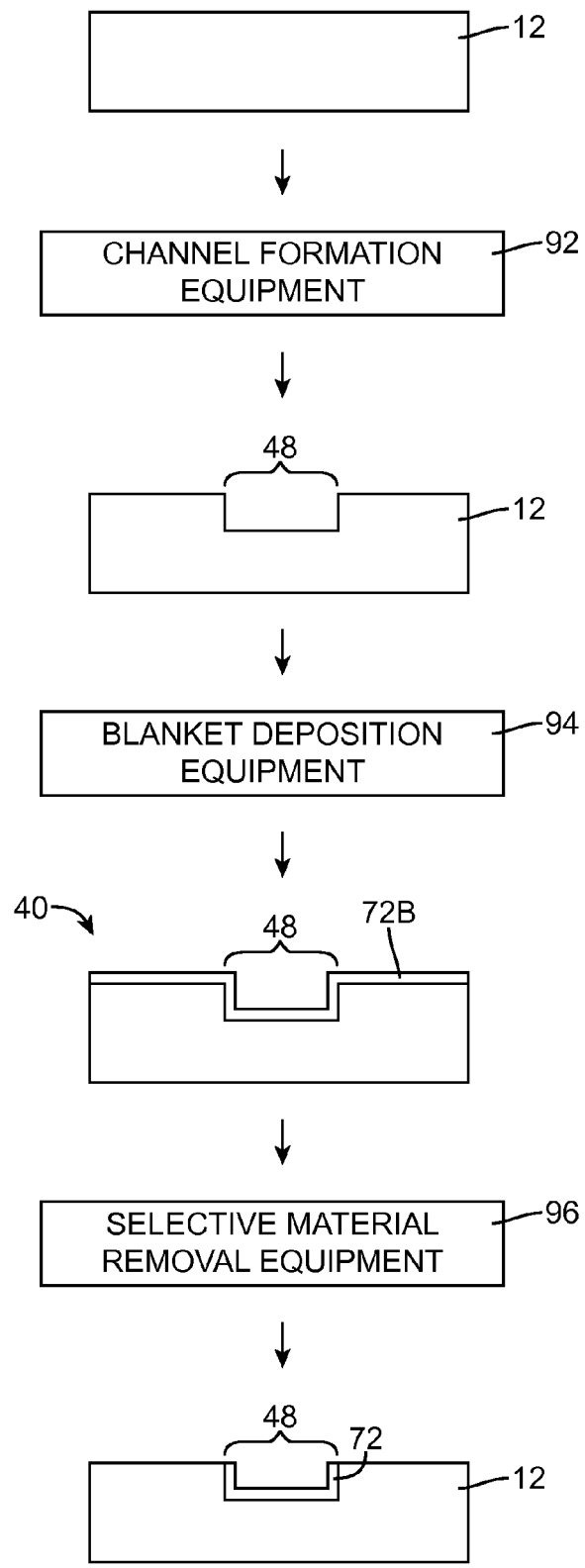
FIG. 19 is a diagram showing how a dielectric layer may be formed within a signal line channel in an electronic device housing by patterning a blanket layer of dielectric in accordance with an embodiment.

FIG. 19 shows how dielectric may be deposited in channel 48 using blanket deposition techniques. In the example of FIG. 19, housing 12 is initially planar and does not contain channels 48. In this type of scenario, channel formation equipment 92 may be used to machine or otherwise process housing 12 to form channel 48 or housing 12. If desired, channels 48 may be formed by a technique to form housing 12 that incorporates channels into housing 12 (e.g., casting). Blanket deposition equipment 94 may be used to form a blanket layer of dielectric (layer 72B) over surface 40 of housing 12 after channels 48 have been formed. Layer 72B may be a grown oxide layer (e.g., an aluminum oxide layer in a scenario in which housing 12 is formed from aluminum), may be a deposited inorganic layer (e.g., silicon oxide, silicon nitride, etc.), may be a polymer layer, or may be other dielectric. Equipment 94 may deposit dielectric 72B using spraying, dripping, spinning, dipping, thermal growth techniques such as thermal oxidation, plasma deposition, physical vapor deposition (e.g., evaporation or sputtering), chemical vapor deposition, or other suitable techniques. Lines 46 may then be formed in channels 48. For example, lines 46 may be formed by localized deposition (e.g., screen printing of conductive ink), by blanket metal deposition followed by photolithographic patterning or other patterning operations, or other patterning techniques. Upper dielectric layer 76 may be deposited locally or globally after lines 46 have been formed.

If desired, selective material removal equipment 96 may remove portions of layer 72B that are not within channel 48 before forming metal signal lines 46, as shown at the bottom of FIG. 19. Equipment 96 may include etching equipment, machining equipment, laser-processing equipment, or other equipment for selectively removing the portions of layer that are not within channel 48.

Components 38 may be electrically coupled to signal lines 36 by directly coupling contacts in components 38 to signal lines using solder, conductive adhesive, or other conductive materials or by using indirect electromagnetic field coupling techniques (i.e., capacitive and/or inductive coupling).

Figure 20:
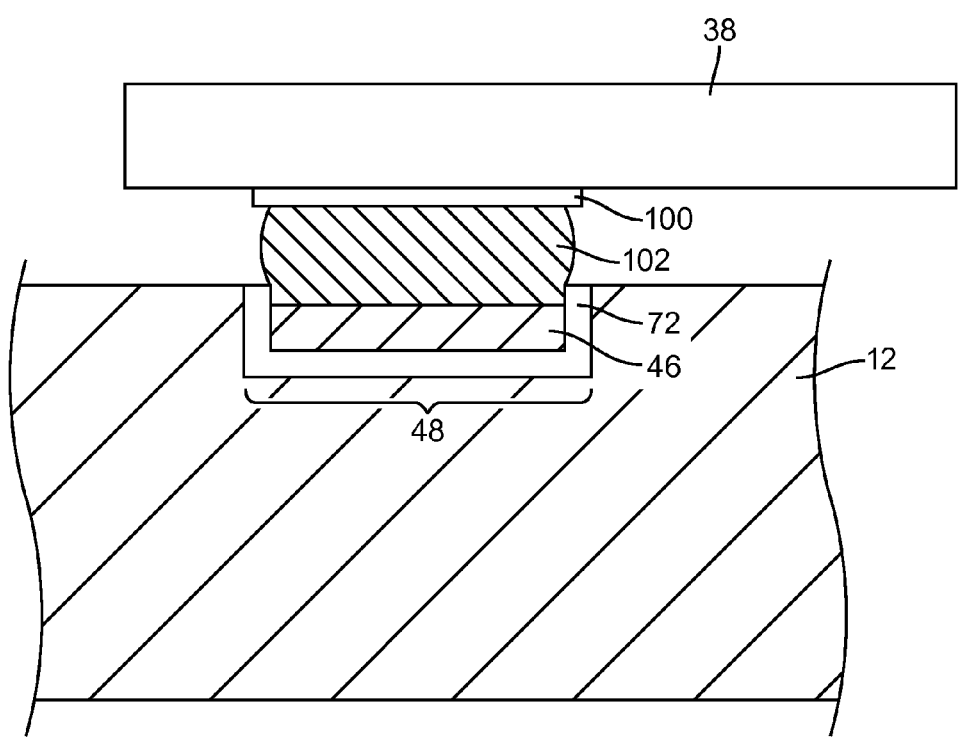
FIG. 20 is a cross-sectional side view of a portion of electronic device housing in which an electrical component has been soldered to a signal line embedded in an electronic device housing channel in accordance with an embodiment.

FIG. 20 is a cross-sectional side view of a channel in electronic device housing 12 (e.g., a metal housing) containing a signal line that is connected to an electrical component with a solder joint. As shown in FIG. 20, electrical component 38 contains signal paths with exposed contacts such as contact 100 (sometimes referred to as a terminal, lead, or solder pad). Contact 100 is soldered to signal line 46 using solder 102. In configurations of the type shown in FIG. 20 in which component 38 is being connected to signal line 46 using solder 102, dielectric 72 is preferably formed from a material that can withstand the temperature to which solder 102 is raised during solder reflow operations (e.g., an inorganic dielectric such as silicon oxide or silicon nitride).

Figure 21:
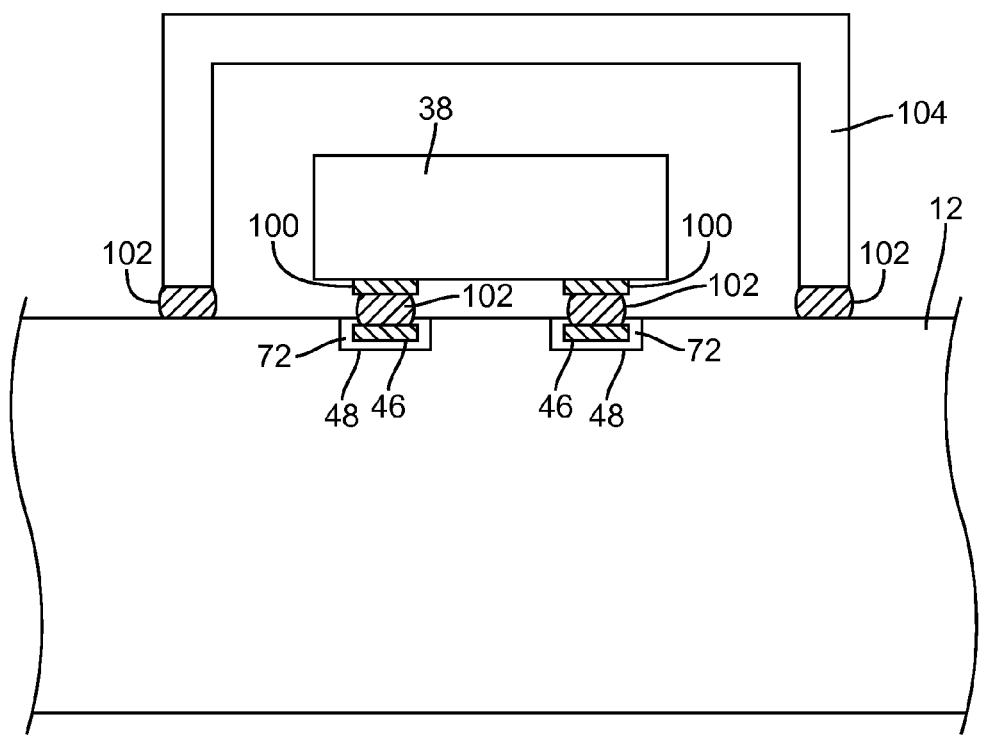
FIG. 21 is a cross-sectional side view of an electrical component and electromagnetic interference shield soldered to signal lines embedded in channels in an electronic device housing in accordance with an embodiment.

FIG. 21 is a cross-sectional side view of a portion of electronic device housing 12 in a configuration in which electromagnetic interference shield (EMI shield) 104 has been soldered to housing 12. If desired, shield 104 may be soldered to signal lines 46 (i.e., solder pads) in channels 48. Shield 104 serves as the upper half of a shielding structure for shielding one or more components such as component 38 under shield 104 that have been soldered to signal lines 46 in channels 48. Housing 12 may be formed from metal and may therefore serve as a mating lower half of the shielding structure (i.e., housing 12 can serve as a ground plane to provide shielding under component 38).

Contacts such as contacts 100 on component 38 can be coupled to signal lines 46 using solder, conductive adhesive, welds, or other conductive connections.

Figure 22:
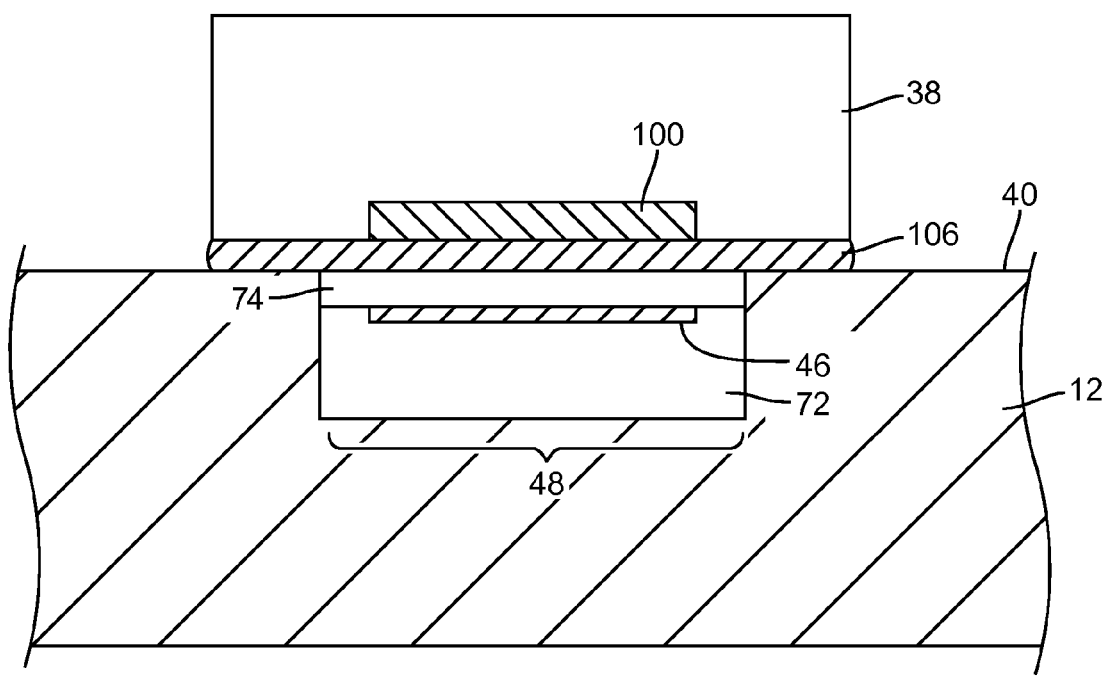
FIG. 22 is a cross-sectional side view of an illustrative signal line in a channel of an electronic device housing that is capacitively coupled to an electrical component that is mounted on the electronic device housing in accordance with an embodiment.

If desired, electrical components 38 can be electromagnetically coupled to signal lines 46. This allows components 38 to be electrically coupled to signal lines 46 without using connections such as solder joints. As shown in FIG. 22, for example, component 38 may have a signal path (signal line) with a contact 100 that serves as a capacitor electrode. Signal line 46 in channel 48 may serve as a capacitively coupled mating capacitor electrode. During operation, signals may be passed between signal line 46 and contact 100 by capacitive coupling. With this type of approach, adhesive (i.e., non-conductive adhesive) such as adhesive 106 may be used to attach component 38 to surface 40 of housing 12.

Figure 23:
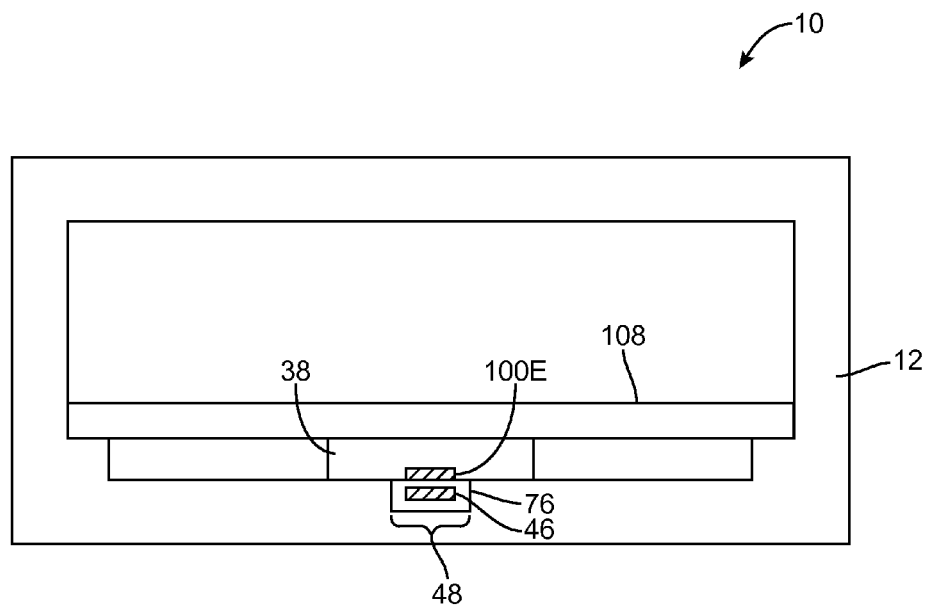
FIG. 23 is a cross-sectional side view of an illustrative electronic device in which downward-facing components on a printed circuit are capacitively coupled to embedded signal lines in channels in a housing for the electronic device in accordance with an embodiment.

FIG. 23 shows how component 38 may be mounted on printed circuit board 108 and may have a downward facing capacitive electrode such as electrode 100E that is capacitively coupled to signal line 46 in channel 48 in housing 12.

Figure 24:
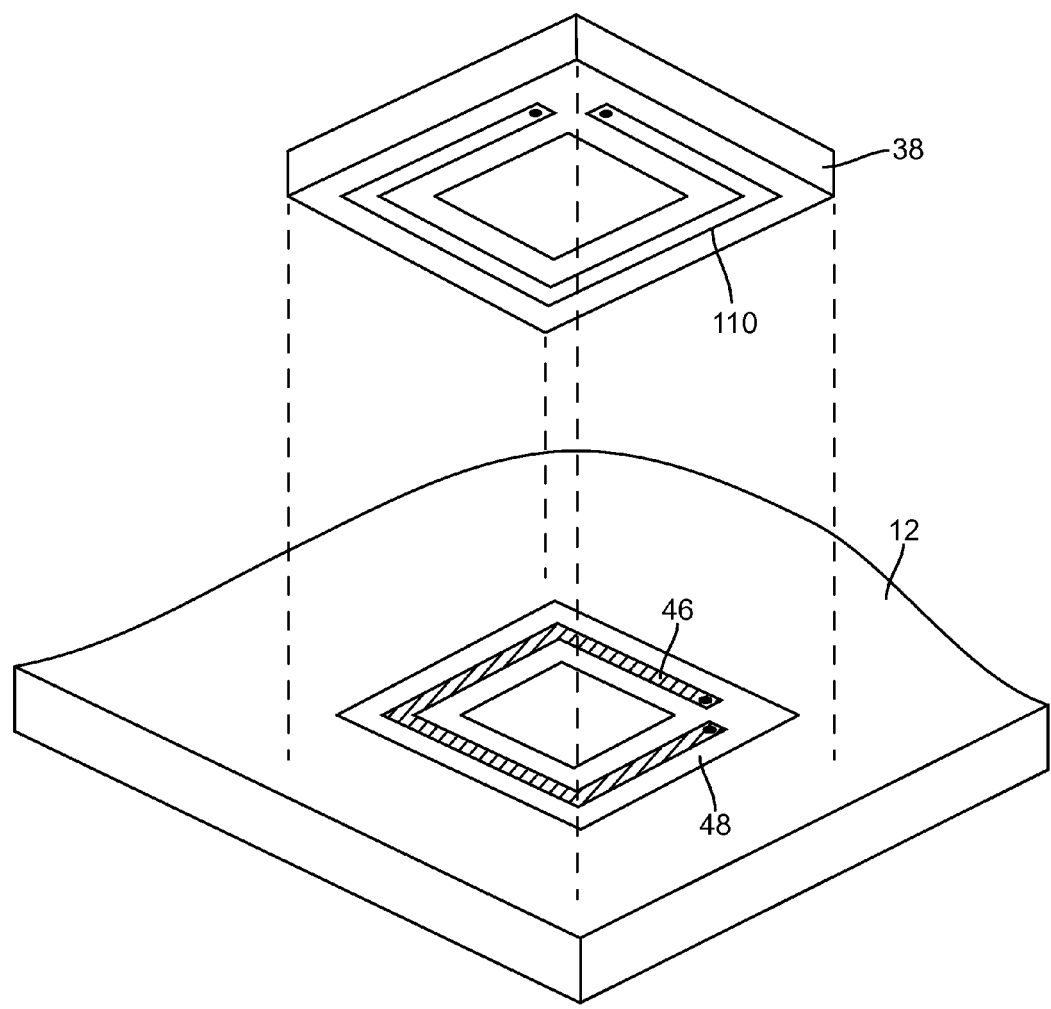
FIG. 24 is an exploded perspective view of an illustrative electronic device housing and associated electrical component showing how the housing may be provided with embedded signal lines that are inductively coupled to the electrical component in accordance with an embodiment of the present invention.

Inductive coupling may also be used to couple component 38 to signal path 36 in housing 12. As shown in the exploded perspective view of FIG. 24, housing 12 may have a loop-shaped channel 48 that contains an inductive loop formed from a loop-shaped signal line 46. Component 38 may have a corresponding loop 110. When component 38 is mounted on housing 12, loop 100 and loop 46 will be inductively coupled. The loops in component 38 and housing 12 may have one or more turns.

Figure 25:
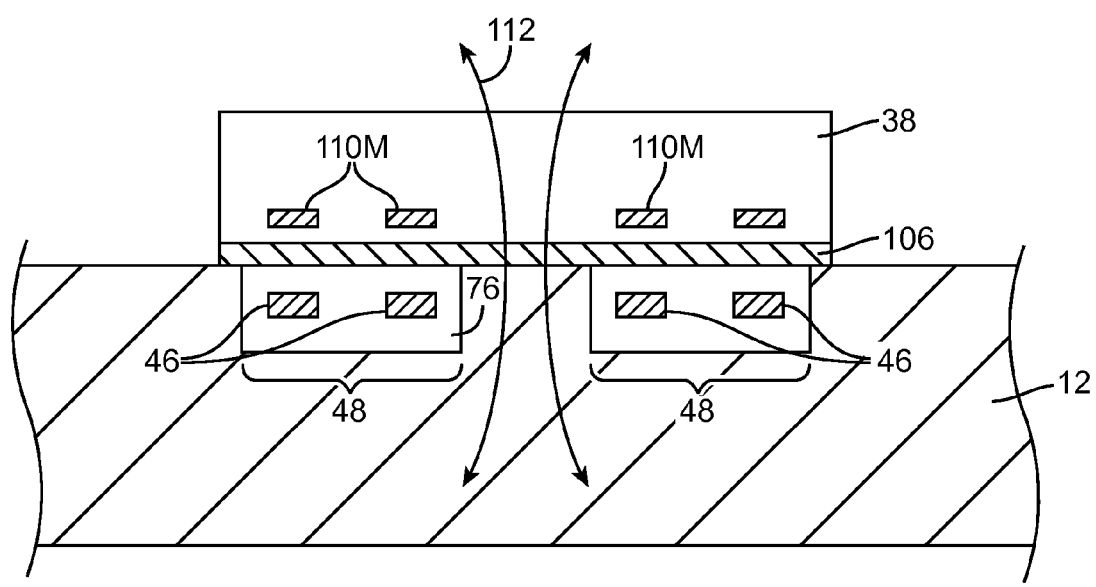
FIG. 25 is a cross-sectional side view of an illustrative electronic device with signal lines that are inductively coupled to signal lines embedded within channels in an electronic device housing in accordance with an embodiment.

In the example of FIG. 25, component 38 has been provided with a loop 110M that has multiple turns of conductive material and a signal line 46 that has multiple turns of conductive material. In this configuration, the loops of component 38 and housing 12 are aligned multi-turn inductive loops. During operation, electromagnetic near field coupling (i.e., inductive coupling) may inductively couple component 38 and path 46, as illustrated by electromagnetic field lines 112. This allows signals to pass between signal lines 46 and component 38.

Figure 26:
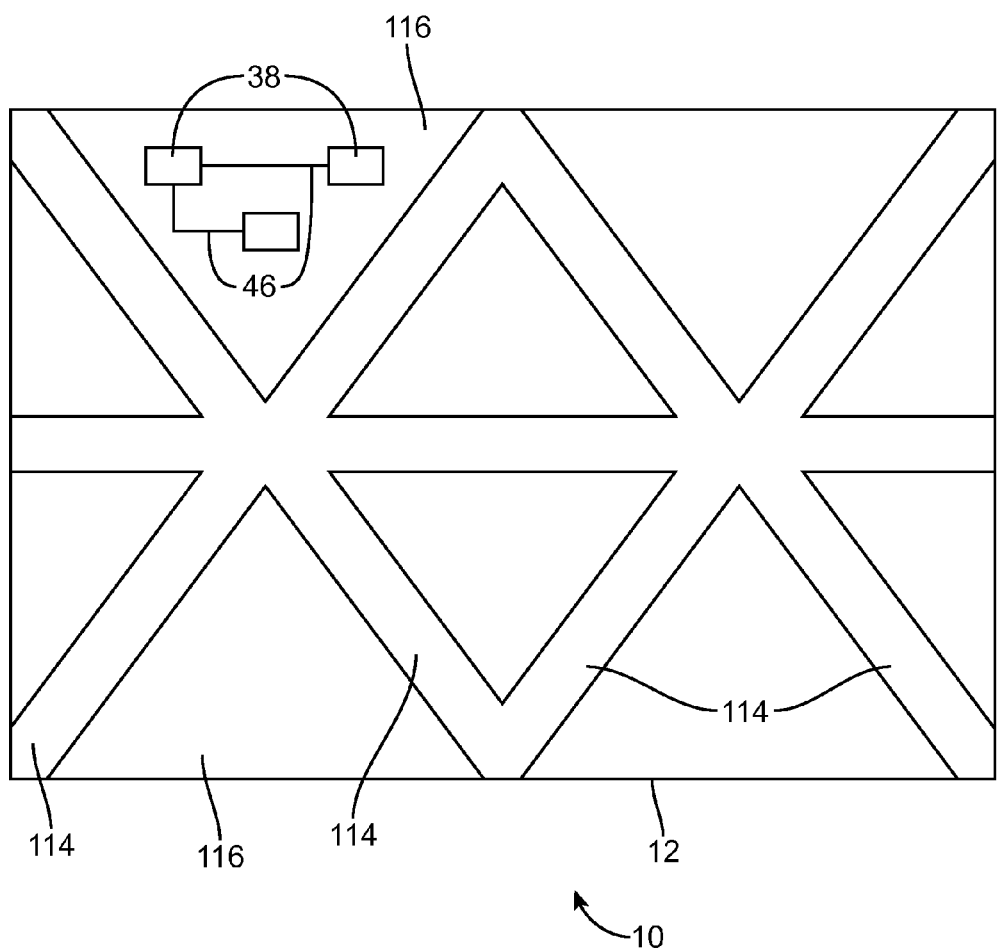
FIG. 26 is a top view of an illustrative electronic device housing having raised ribs separated by recesses within which signal lines for coupling electronic devices have been formed.

FIG. 26 shows how housing 12 may have recesses such as recesses 116 between raised ribs such as raised ribs 114. Components 38 may be interconnected using signal lines 46 that are formed within recesses 116 (e.g., using an arrangement of the type shown in FIG. 11 or using signal lines 46 that are embedded within channels 48 formed in recesses 116).

Figure 27:
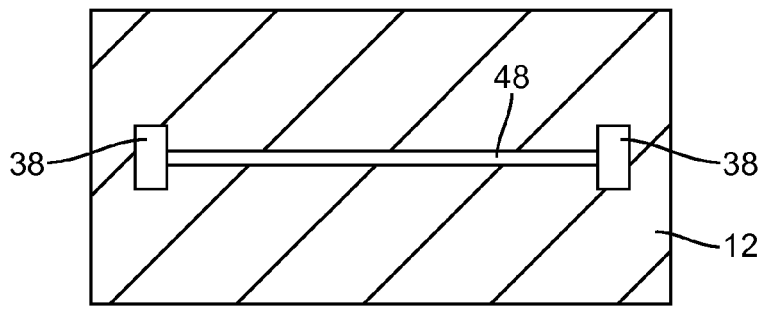
FIG. 27 is a top interior view an illustrative electronic device housing in which electrical components have been coupled together using signal lines in a straight electronic device housing channel in accordance with an embodiment.
Figure 28:
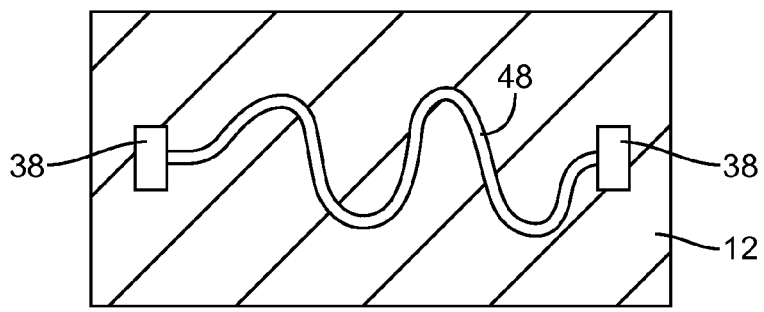
FIG. 28 is a top interior view an illustrative electronic device housing in which electrical components have been coupled together using signal lines in a meandering electronic device housing channel in accordance with an embodiment.
Figure 29:
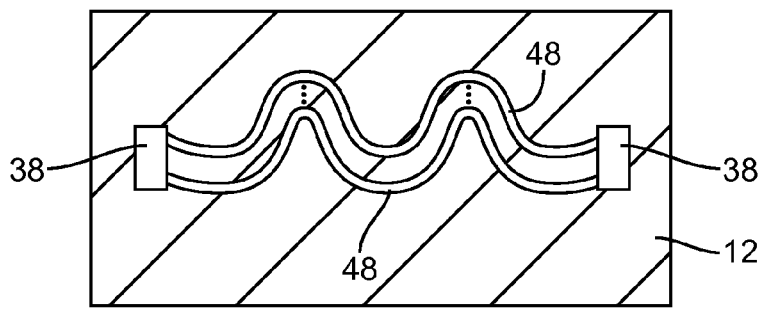
FIG. 29 is a top interior view an illustrative electronic device housing in which electrical components have been coupled together using signal lines in parallel meandering electronic device housing channels in accordance with an embodiment.
Figure 30:
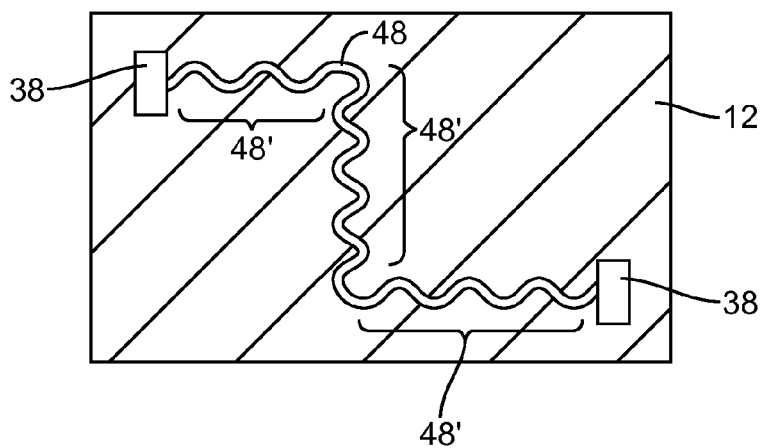
FIG. 30 is a top interior view an illustrative electronic device housing in which electrical components have been coupled together using signal lines in an electronic device housing channel that has multiple perpendicular segments in accordance with an embodiment.

It may be desirable to configure channels 48 so that signal paths are minimized in length, as shown by the illustrative straight channel 48 in FIG. 27. To help maintain housing integrity (i.e., resistance to cracking along channel 48), it may be desirable to provide channel 48 with a meandering path, as shown in FIG. 28. In the FIG. 29 example, multiple parallel channels 48 have been provided with meandering paths. FIG. 30 shows how channel 48 may be made up of multiple orthogonal segments (e.g., to avoid creating a weakened line that spans housing 12).

Figure 31:
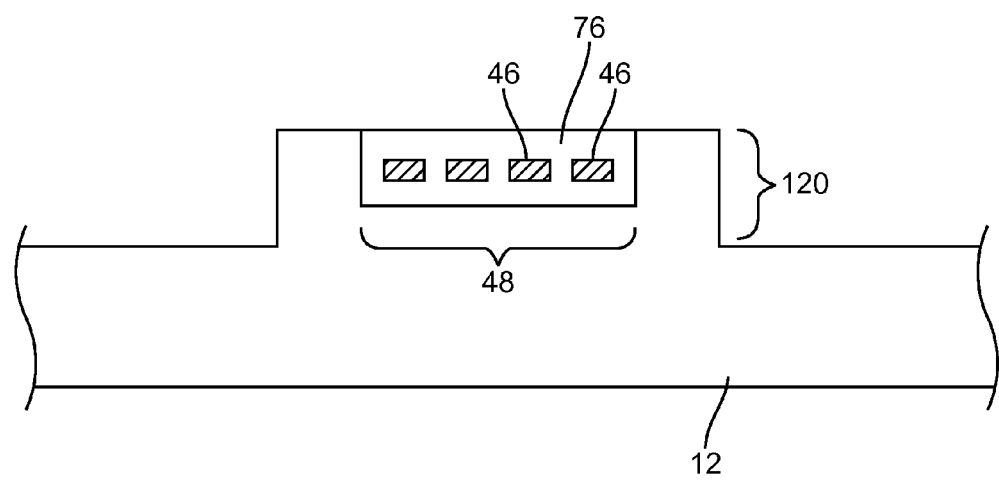
FIG. 31 is a cross-sectional side view of a portion of a raised rib in an electronic device housing that has been provided with a channel containing signal lines in accordance with an embodiment of the present invention.

As shown in FIG. 31, housing 12 may have one or more channels such as channel 48 that are formed within locally raised portions of housing 12 such as rib 120.

Figure 32:
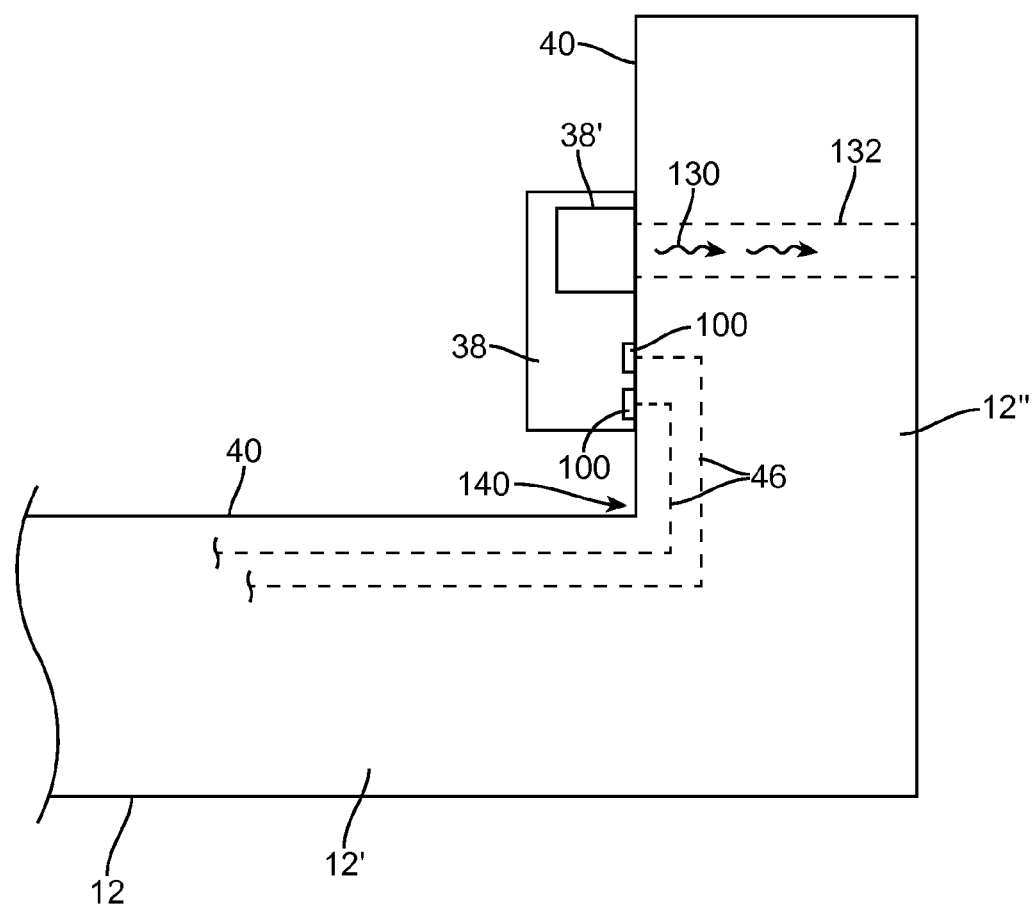
FIG. 32 is a cross-sectional side view of an illustrative electronic device housing containing signal lines that extend across perpendicular housing surfaces in accordance with an embodiment of the present invention.

FIG. 32 is a cross-sectional side view of an illustrative housing with a right-angle bend and a corresponding inner surface having a right-angle bend. As shown in FIG. 32, housing 12 has inner surface 40, which extends along rear wall 12' and side wall 12". Component 38 in the example of FIG. 32 is a light-emitting diode that emits light 130 through hole 132 in housing side wall 12" from light emitting element 38'. Contacts 100 may be coupled to signal paths 46 in channels that run along inner surface 40 of side wall 12" and that run along inner surface 40 of rear wall 12'. Channels 48 and signal paths 46 can traverse right-angle corner 140 or other surface features on interior surface 40 of housing 12.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a metal electronic device housing having a wall, wherein the metal electronic device housing comprises a channel formed in the wall, wherein the electronic device has an exterior, and wherein the wall of the metal electronic device housing forms a portion of the exterior of the electronic device;
   a display mounted in the metal electronic device housing;
   a signal line on the metal electronic device housing that is formed in the channel;
   an electrical component that is electrically coupled to the signal line;
   dielectric in the channel between the metal electronic device housing and the signal line, wherein the signal line comprises a metal signal line, wherein the electrical component has a contact; and
   solder with which the contact is soldered to the metal signal line.

2. The electronic device defined in claim 1 wherein the dielectric in the channel comprises an inorganic dielectric.

3. The electronic device defined in claim 1 wherein the electronic device housing comprises a housing selected from the group consisting of: a portable computer housing, a cellular telephone housing, a tablet computer housing, and a display housing.

4. The electronic device defined in claim 1 wherein the metal signal line is one of a plurality of parallel metal signal lines in the channel.

5. The electronic device defined in claim 1 wherein the housing has an inner surface with a right-angle bend and wherein the channel traverses the right-angle bend.

6. The electronic device defined in claim 5 wherein the component is mounted on a side wall of the housing and wherein at least some of the channel is on a rear wall of the housing.

7. Apparatus, comprising:
   a metal electronic device housing having a wall and a channel, wherein the channel has an inner surface, wherein the wall has an interior surface and an exterior surface, and wherein the channel comprises a recess that extends from the interior surface towards the exterior surface;
   a layer of dielectric in the channel that is coated on and in direct contact with the inner surface of the channel; and
   a signal line in the channel that is in direct contact with the layer of dielectric.

8. The apparatus defined in claim 7 wherein the layer of dielectric separates the signal line from the metal electronic device housing.

9. The apparatus defined in claim 8 wherein the signal line is a metal signal line.

10. The apparatus defined in claim 9 further comprising a plurality of integrated circuits having contacts that are electrically coupled to the signal line.

11. A method, comprising:
    forming a channel in a wall of a metal electronic device housing;
    forming a first dielectric layer in the channel;
    after forming the first dielectric layer in the channel, forming a metal signal line on the first dielectric layer;
    after forming the metal signal line on the first dielectric layer, forming a second dielectric layer on the metal signal line; and
    mounting an integrated circuit such that the metal signal line is separated from the integrated circuit by the second dielectric layer.

12. The method defined in claim 11 wherein forming the channel comprises forming a channel with a meandering path.

13. The method defined in claim 11 wherein forming the channel comprises forming the channel within a raised rib on the metal electronic device housing.

14. The electronic device defined in claim 1, wherein the wall has an interior surface and an exterior surface, and wherein the channel comprises a recess that extends from the interior surface towards the exterior surface.

15. The method defined in claim 11, wherein forming the dielectric layer in the channel comprises forming the dielectric layer using a method selected from the group consisting of: spraying, dripping, dipping, physical vapor deposition, and chemical vapor deposition.

16. The electronic device defined in claim 1 further comprising:
    a display cover layer that overlaps the display and the metal electronic device housing.

17. The apparatus defined in claim 7, wherein the channel is defined by first and second opposing surfaces of the metal electronic device housing that are connected by a third surface of the metal electronic device housing, wherein the first, second, and third surfaces of the metal electronic device housing form the inner surface of the channel, and wherein the layer of dielectric in the channel is coated on and in direct contact with the first, second, and third surfaces of the metal electronic device housing.

18. The apparatus defined in claim 8, wherein the layer of dielectric has first and second opposing surfaces, wherein the first surface is in direct contact with the signal line, and wherein the second surface is in direct contact with the interior surface of the wall of metal electronic device housing.

19. The method defined in claim 11 wherein the integrated circuit has a contact that is capacitively coupled to the metal signal line through the second dielectric layer.

20. The method defined in claim 11 wherein the metal signal line is configured to form an inductive loop and wherein the integrated circuit is inductively coupled to the inductive loop through the second dielectric layer.

21. The method defined in claim 11, wherein the wall of the metal electronic device housing has an interior surface and an exterior surface, and wherein forming the channel in the wall of the metal electronic device housing comprises forming a recess that extends from the interior surface towards the exterior surface without reaching the exterior surface.

22. The electronic device defined in claim 1, further comprising:
   an electromagnetic interference shield that is soldered to the wall of the metal electronic device housing.

23. The electronic device defined in claim 22, wherein the electromagnetic interference shield shields the electrical component, and wherein the wall of the metal electronic device housing serves as a ground plane to provide shielding for the electrical component.

24. The electronic device defined in claim 14, wherein the channel is defined by first and second opposing surfaces of the metal electronic device housing that are connected by a third surface of the metal electronic device housing.

\* \* \* \* \*